US010012296B2

(12) United States Patent
Connolly

(10) Patent No.: US 10,012,296 B2
(45) Date of Patent: Jul. 3, 2018

(54) COMPENSATING DRIVE NUT ASSEMBLY

(71) Applicant: Raytheon Company, Waltham, MA (US)

(72) Inventor: John Maxwell Connolly, Penetanguishene (CA)

(73) Assignee: RAYTHEON COMPANY, Waltham, MA (US)

(*) Notice: Subject to any disclaimer, the term of this patent is extended or adjusted under 35 U.S.C. 154(b) by 522 days.

(21) Appl. No.: 14/442,553

(22) PCT Filed: Jul. 26, 2013

(86) PCT No.: PCT/US2013/052221
§ 371 (c)(1),
(2) Date: May 13, 2015

(87) PCT Pub. No.: WO2014/099041
PCT Pub. Date: Jun. 26, 2014

(65) Prior Publication Data
US 2016/0258517 A1 Sep. 8, 2016

Related U.S. Application Data

(60) Provisional application No. 61/740,184, filed on Dec. 20, 2012.

(51) Int. Cl.
F16H 25/06 (2006.01)
F16H 25/24 (2006.01)
(Continued)

(52) U.S. Cl.
CPC ......... *F16H 25/2454* (2013.01); *G02B 7/023* (2013.01); *F16H 2025/209* (2013.01)

(58) Field of Classification Search
CPC ........... F16H 25/2454; F16H 2025/209; G02B 7/023
See application file for complete search history.

(56) References Cited

U.S. PATENT DOCUMENTS 5,659,806 A * 8/1997 Miyamoto ........... G02B 27/646
348/208.11
6,123,426 A 9/2000 Devenyi
(Continued)

FOREIGN PATENT DOCUMENTS

WO 2012040556 A2 3/2012

OTHER PUBLICATIONS

Extended European Search Report from corresponding European Application No. 13866470.1 dated Jul. 25, 2016.
(Continued)

Primary Examiner — David M Fenstermacher
(74) Attorney, Agent, or Firm — Lando & Anastasi, LLP

(57) ABSTRACT

An objective mount assembly includes a housing having a body and a drive assembly supported by the body. The drive assembly includes a drive shaft, a lead screw rotatably coupled to the drive shall, and a compensating drive nut assembly. The compensating drive nut assembly has an inner nut component threadably coupled to the lead screw and an outer nut component threadably coupled to the inner nut component. The objective mount assembly further includes an objective mount coupled to the drive assembly. Other aspects of the assembly are further disclosed.

18 Claims, 5 Drawing Sheets

(51) Int. Cl.
    *G02B 7/02*         (2006.01)
    *F16H 25/20*       (2006.01)

(56) References Cited

U.S. PATENT DOCUMENTS

| | | | | |
|---|---|---|---|---|
| 6,491,401 B2 * | 12/2002 | Tachibana | .............. | G03B 21/10 |
| | | | | 353/101 |
| 6,773,117 B2 * | 8/2004 | Watanabe | ............ | H04N 9/3105 |
| | | | | 348/E9.027 |
| 6,791,769 B2 * | 9/2004 | Takeda | ................. | H04N 5/2254 |
| | | | | 348/E5.028 |
| 6,966,657 B2 | 11/2005 | Van De Velde et al. | | |
| 7,832,949 B2 | 11/2010 | Mayhew et al. | | |
| 7,922,343 B2 | 4/2011 | Lee et al. | | |
| 8,042,415 B2 * | 10/2011 | Ito | ........................ | B60N 2/0232 |
| | | | | 297/408 |
| 8,891,026 B2 * | 11/2014 | Ono | ........................ | G03B 5/06 |
| | | | | 348/745 |
| 2003/0095337 A1 * | 5/2003 | Tu | ......................... | G02B 7/023 |
| | | | | 359/696 |
| 2008/0168852 A1 | 7/2008 | Chen et al. | | |

OTHER PUBLICATIONS

Notification of Transmittal of the International Search Report and the Written Opinion of the International Searching Authority from corresponding PCT/US2013/052221 dated Jan. 10, 2014.

\* cited by examiner

COMPENSATING DRIVE NUT ASSEMBLY

This application is a U.S. National Stage Application under 35 U.S.C. § 371 of International Application No. PCT/US2013/052221, filed Jul. 26, 2013, which claims priority to U.S. Provisional Patent Application No. 61/740,184, filed Dec. 20, 2012, both which are incorporated by reference in its entirety for all purposes.

BACKGROUND OF THE INVENTION

The present disclosure is directed to drive assemblies, and more particularly to a compensating drive nut assembly.

A lead screw, which is sometimes referred to as a power screw or a translation screw, is a threaded screw that is used as a linkage in a machine to translate turning motion into linear motion. Lead screws are often used in linear actuators, sliding mechanisms, and other machine devices requiring translation of turning motion into linear motion. The device described herein provides for an effective assembly and method of decoupling the lead screw drive from guiding linear bearings, thereby reducing or eliminating binding due to slight misalignment between the drive axis and the bearing axis.

SUMMARY OF THE INVENTION

One aspect of the disclosure is directed to an objective mount assembly comprising a housing including a body, a drive assembly supported by the body, the drive assembly including a drive shaft, a lead screw rotatably coupled to the drive shaft, and a compensating drive nut assembly having an inner nut component threadably coupled to the lead screw and an outer nut component threadably coupled to the inner nut component, and an objective mount coupled to the drive assembly.

Embodiments of the objective mount assembly further may include the inner nut component having a threaded inner diameter, which interfaces with and matches a thread of a lead screw. The inner nut component may include a flange and the outer nut component includes a flange, the objective mount being captured between the flanges of the inner and outer nut components. The inner nut component may include an anti-rotation feature that allows the assembled nut component to be axially compliant while preventing rotation. The anti-rotation feature may be configured to lock the inner nut component and the outer nut component together when assembling the compensating drive nut assembly. The flange of the outer nut component may include a drive feature to facilitate locking the nut components together. A distance between the flanges of the inner and outer nut components may be controlled during manufacture to produce a clearance fit on a mating part in the drive assembly. An external surface of the inner nut component may be threaded to facilitate assembly with the outer nut component. The inner nut component and the outer nut component may be secured to one another. The drive assembly further may include a worm secured to the drive shaft and a worm gear secured to the lead screw. The objective mount may be configured to be secured to an object requiring movement.

Another aspect of the disclosure is directed to a method of assembling a drive assembly of an objective mount assembly of the type including a housing and an objective mount. In one embodiment, the method comprises: locating a first bearing on a lead screw by sliding the bearing on to the lead screw toward a head of the lead screw; assembling an outer drive nut component and an inner drive nut component by threading the drive nut components together on the slide with the objective mount being disposed between the outer and inner drive nut components, ensuring the drive nut components move freely with respect to one another; threadably inserting the lead screw into the inner drive nut component; locating a second bearing on the lead screw; securing a worm gear onto the lead screw; and setting a gap between a bottom of the outer drive nut component and a surface of a cut-out of in the slide.

Embodiments of the method may include providing a 3.9 mm gap. The method further may include installing a retaining hex nut onto the lead screw. The retaining hex nut may be turned to a torque of 1.25 inch-pounds (max.), and staked with a set screw. The inner nut component and the outer nut component may be secured to one another.

Yet another aspect of the disclosure is directed to a method of operating an objective mount assembly of the type comprising a housing including a body, a drive assembly supported by the body, the drive assembly including a drive shaft, a lead screw rotatably coupled to the drive shaft, and a compensating drive nut assembly having an inner nut component threadably coupled to the lead screw and an outer nut component threadably coupled to the inner nut component, and an objective mount coupled to the drive assembly. In one embodiment, the method comprises driving the rotation of the drive shaft to drive the rotation of the lead screw to move the compensating drive nut assembly axially along a length of the lead screw thereby moving the objective mount with respect to the body.

Embodiments of the method may include driving the rotation of the drive shaft by turning a worm associated with the drive shaft, the worm being engaging a worm gear associated with the lead screw. The drive shaft may be rotated in a clockwise direction when viewed from a driven end, which in turn rotates the lead screw in a counterclockwise direction to move the drive nuts downwardly to lower the objective mount. The drive shaft may be rotated in a counterclockwise direction when viewed from the driven end, which in turn rotates the lead screw in a clockwise direction to move the drive nuts upwardly to raise the slide and the objective mount.

DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DESCRIPTION OF THE INVENTION

An objective mount assembly of embodiments of the present disclosure employs a two-piece design of a drive nut assembly, which enables the drive nut assembly to be machined and assembled to a predicted "shut" height so as to float on a mating part. There is a small amount of axial and lateral clearance allowed between the drive nut assembly and the mating part. An anti-rotation feature of the drive nut assembly prevents the drive nut assembly from rotating with the lead screw. The lead screw is driven from stop-to-stop to ensure performance and range, and then driven to approximately the middle of travel for final adhesive staking if desired. The drive nut assembly can be used in small assemblies and assemblies where its desirable adhesive can be used to bond the aligned nut assembly.

The compact design uses a two-piece nut assembly that reduces weight and allows a variety of material options that could provide other benefits, e.g., magnetic or non-magnetic material, high-wear resistant materials, etc. The nut assembly also provides the option of specialized, non-standard threads that may not be practical in conventional threaded body designs, an example being multi-start threads. As discussed, the drive nut assembly has an anti-rotation feature that permits the drive nut assembly to remain free floating in operation or to be staked with adhesive once assembled. In drive assemblies with sensitive resolution or zero backlash requirements, it is advisable to bond the aligned nut assembly to the mating part. Both a position and a tilt error of the drive nut assembly as well as a position and an axis of the lead screw are effectively compensated. Equally important, differences between a drive path and a guide path (i.e., bearing, bushings, etc.) have been accommodated for in the design of the drive nut assembly.

Figure 1:
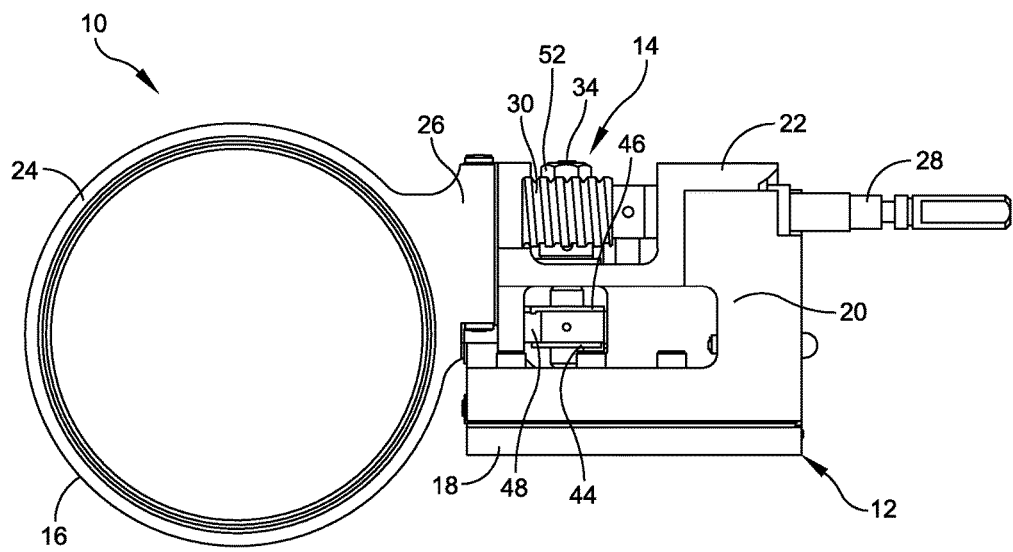
FIG. 1 is an elevational view of objective mount assembly of an embodiment of the disclosure.
Figure 2:
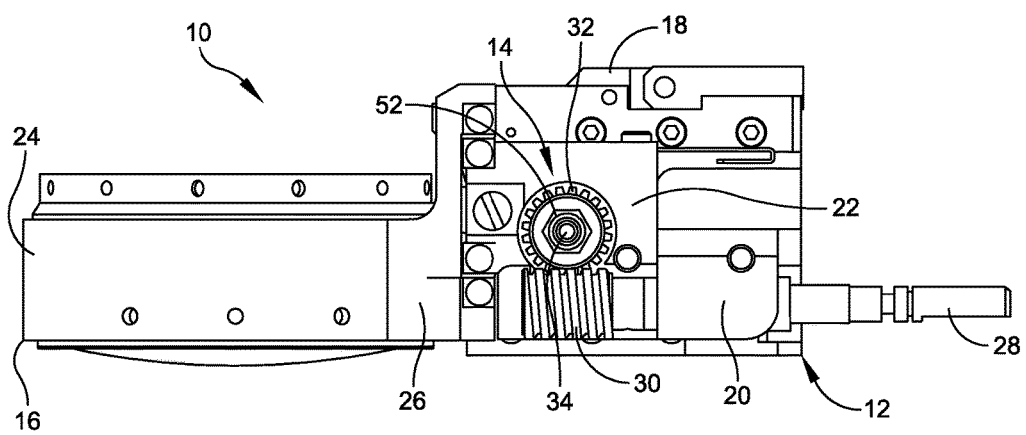
FIG. 2 is a top plan view of the objective mount assembly.

Referring now to the drawings, and more particularly to FIGS. 1 and 2, an objective mount assembly is generally indicated at 10. The objective mount assembly 10 is configured to move an object a precise distance. As shown, the objective mount assembly 10 includes a housing assembly generally indicated at 12, a drive assembly generally indicated at 14, which is supported by the housing assembly, and an objective mount 16, which is movably operated and coupled to the housing assembly. The housing assembly 12 includes a base plate 18, which may be mounted on a flat surface, a main body 20 secured to the base plate, and a slide 22, which is movably coupled to the main body. As shown, the main body 20 is uniquely configured to secure and mount the slide 22 and the various components of the drive assembly 14.

The objective mount 16 and the slide 22 are secured to one another in the manner described below. The result is that the objective mount 16 is moved in an up-and-down direction as shown in FIG. 1 by driving the rotation of the drive assembly 14. The objective mount 16 is configured to support or secure an object that requires a fine or precise amount of linear movement. In the shown embodiment, the objective mount 16 is moved in an up-and-down direction. In one embodiment, the objective mount 16 includes a ring portion 24 configured to secure a cylindrical object to the objective mount assembly 10. The objective mount 16 further includes a support portion 26 that is configured to be secured to the drive assembly 14 and the slide 22 of the housing assembly 12. Although the ring portion 24 is shown and described herein, it should be understood that the objective mount 16 of embodiments of the present disclosure may be used to secure and move any object having of varying size and shape. The provision of the ring portion 24 is for illustration purposes only.

Still referring to FIG. 1, in one embodiment, the drive assembly 14 includes a worm drive. Specifically, the drive assembly 14 includes a rotatable drive shaft 28 having a worm 30 on one end of the drive shaft. The opposite end of the drive shaft 28 is driven by a motor (not shown). The drive shaft 28 may be suitably coupled to the motor or some other mechanism to cause the rotation of the drive shaft. The drive assembly 14 further includes a worm gear 32 that meshes with the worm 30. The provision of the worm drive reduces rotational speed and allows higher torque to be transmitted during operation. The drive assembly 14 further includes a lead screw 34, on which the worm gear 32 is mounted. As will be described in detail below, the lead screw 34 is coupled to the support portion 26 of the objective mount 16 such that when the lead screw is rotated, the objective mount is moved in an up-and-down direction depending on the direction of rotation of the lead screw. In other embodiments, the objective mount assembly 10 can be configured to move the objective mount 16 in a side-to-side or some other direction. The manner in which the lead screw 34 is coupled to the support portion of the objective mount 16 will be described in greater detail below.

Figure 3:
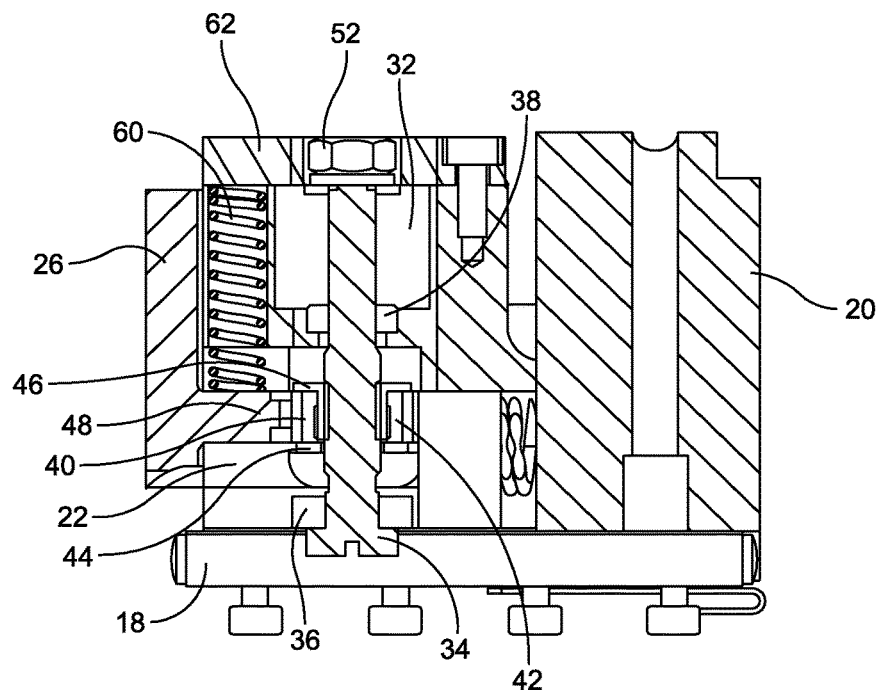
FIG. 3 is a cross-sectional view showing the objective mount assembly.
Figure 4:
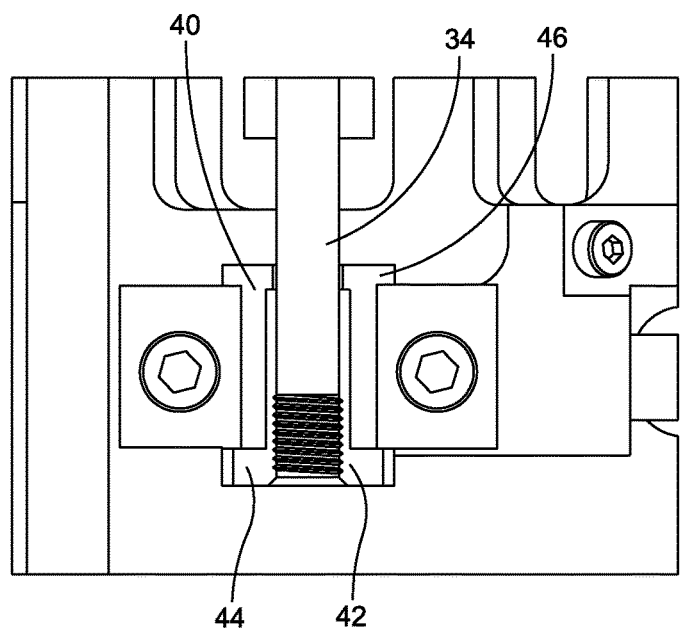
FIG. 4 is an enlarged cross-sectional view of the objective mount assembly.
Figure 5:
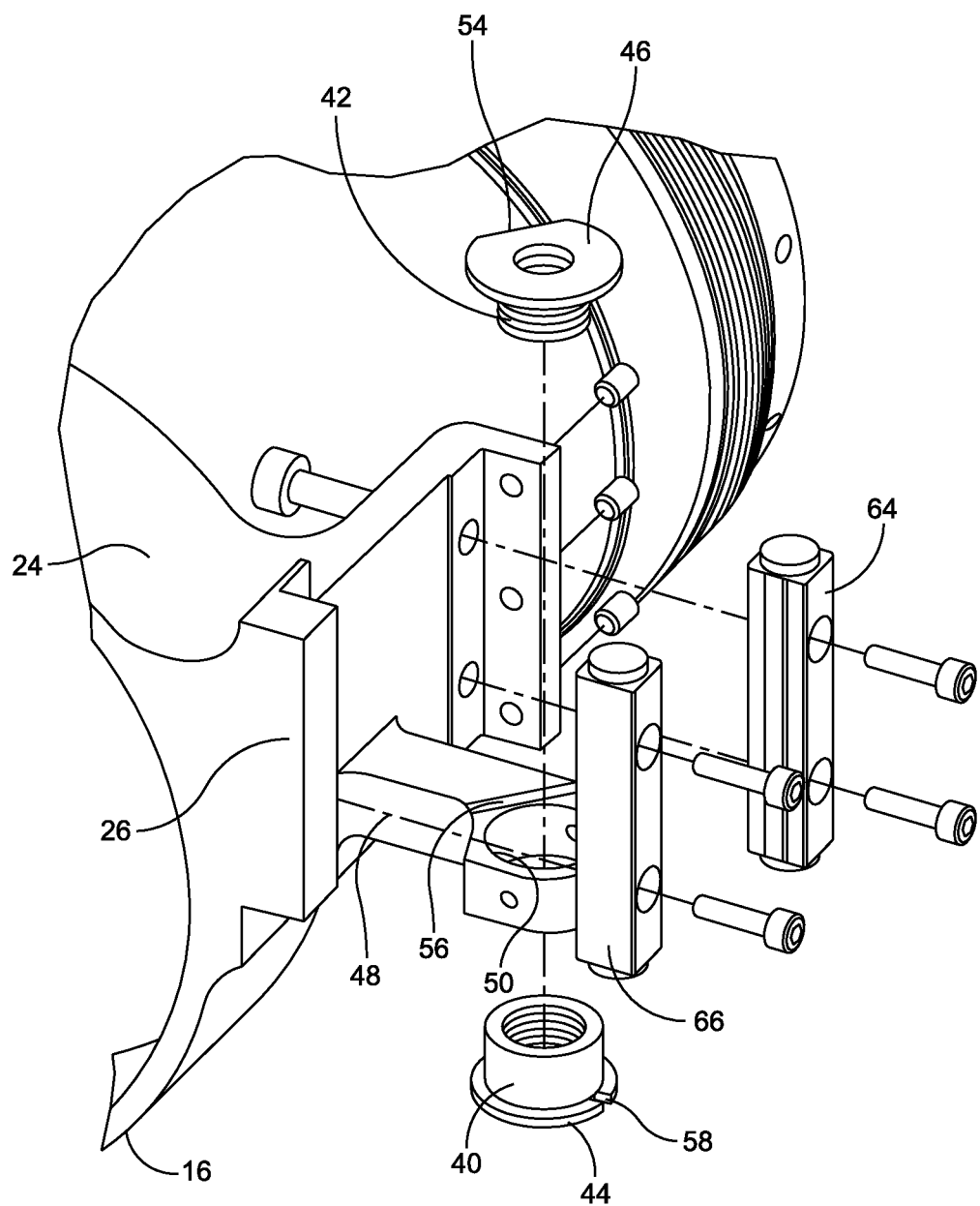
FIG. 5 is an enlarged exploded perspective view of a portion of the objective mount assembly.

Referring to FIGS. 3-5, the manner in which the lead screw 34 is coupled to the support portion 26 of the objective mount 16 is illustrated. As shown, the drive assembly 14 further includes two bearings 36, 38 and a compensating drive nut assembly having an outer drive nut 40 and an inner drive nut 42. A first bearing 36 is slid onto the lead screw 34 toward a headed end of the lead screw. When assembled, the first bearing 36 fits within a cavity formed in the main body 20 of the housing assembly 12. The outer drive nut 40 and the inner drive nut 42 are threaded together with one another to ensure that the drive nuts move freely. As best shown in FIGS. 4 and 5, the outer drive nut 40 includes a bottom flange 44 and the inner drive nut 42 includes a top flange 46. The support portion 26 of the objective mount 16 includes an extension member 48 having a circular opening 50 formed therein. The assembled compensating drive nuts 40, 42 are inserted into and captured within the opening 50 formed in the extension member 48 of the support portion 26 of the objective mount 16 so that the extension member is captured between the bottom flange 44 of the outer drive nut and the top flange 46 of the inner drive nut. In another embodiment, the assembled drive nuts 40, 42 are inserted into an opening formed in the slide, and the slide is securely fastened to the objective mount. The inner drive nut 42 includes internal threads that threadably engage external threads provided on the lead screw 34. A second bearing 38 is then slid onto the lead screw 34 toward a free end of the lead screw. The second bearing 38 fits within a cavity formed in the slide 22 of the housing assembly 12. The first and second bearings 36, 38 provide stability to the lead screw 34 during operation of the objective mount assembly 10. The assembly of the components on the lead screw 34 is completed by sliding the worm drive 32 onto the lead screw 34 and securing the worm drive in place. A retaining hex nut 52 is secured on the free end of the lead screw 34 to hold the assembly together.

Referring to FIG. 5, the inner drive nut 42 has a threaded inner diameter, which interfaces with and matches external threads provided on the lead screw 34, and a threaded external surface. The top flange 46 of the inner drive nut 42 contains an anti-rotation feature embodying a flat edge 54, which allows the assembled outer and inner drive nuts 40, 42 to be axially compliant while preventing rotation. Specifically, the flat edge 54 is configured to engage a milled surface 56 provided on the extension member 48 of the support portion 26 of the objective mount 16, which prevents the inner nut 42 from rotating during operation. This anti-rotation feature is also used at assembly to facilitate locking the outer and inner drive nuts 40, 42 together. As mentioned, the external surface of the inner drive nut 42 is also threaded to facilitate assembly with the outer drive nut 40. The inner diameter of the outer drive nut 40 is threaded and matches the threads on the external surface of the inner drive nut 42. The bottom flange 44 of the outer drive nut 40 is provided with a drive feature to facilitate a locking of the outer and inner drive nuts 40, 42 together. In one embodiment, the drive feature is a notch 58 formed in the bottom flange 44 of the outer drive nut 40 to assist in facilitating the driving rotation of the outer drive nut. The distance between respective bottom and top flanges 44, 46 of respective outer and inner drive nuts 40, 42 is controlled during manufacture to produce a clearance fit on the mating part in the assembly. In one embodiment, the clearance should be between 0.03 millimeters (mm) and 0.15 mm depending on the size and related geometry of the application. This slight axial clearance is needed to allow the nut assembly to tilt and align axially to the lead screw 34 at assembly.

A spring 60 is provided between the extension member 48 of the support portion 26 of the objective mount 16 and a top plate 62, which is secured to the main body 20 of the housing assembly 12. The spring 62 provides a downward bias on the extension member 48 during operation of the drive assembly 14. The arrangement is such that when the worm 30 rotates the worm gear 32 provided on the lead screw 34, the lead screw rotates to drive the movement of the outer and inner nuts 40, 42, which in turn moves the objective mount 16 upward and downward. In one embodiment, the rotation of the worm drive in one direction causes the upward movement of the objective mount 16 and the rotation of the worm drive in an opposite direction causes the downward rotation of the objective mount. The provision of the outer and inner nuts 40, 42 eliminates the potential for the lead screw 34 to bind when the lead screw rotates and reduces friction induced drive torque since the lead screw now only sees normal, calculated friction without additional off-axis contribution.

Figure 6A:
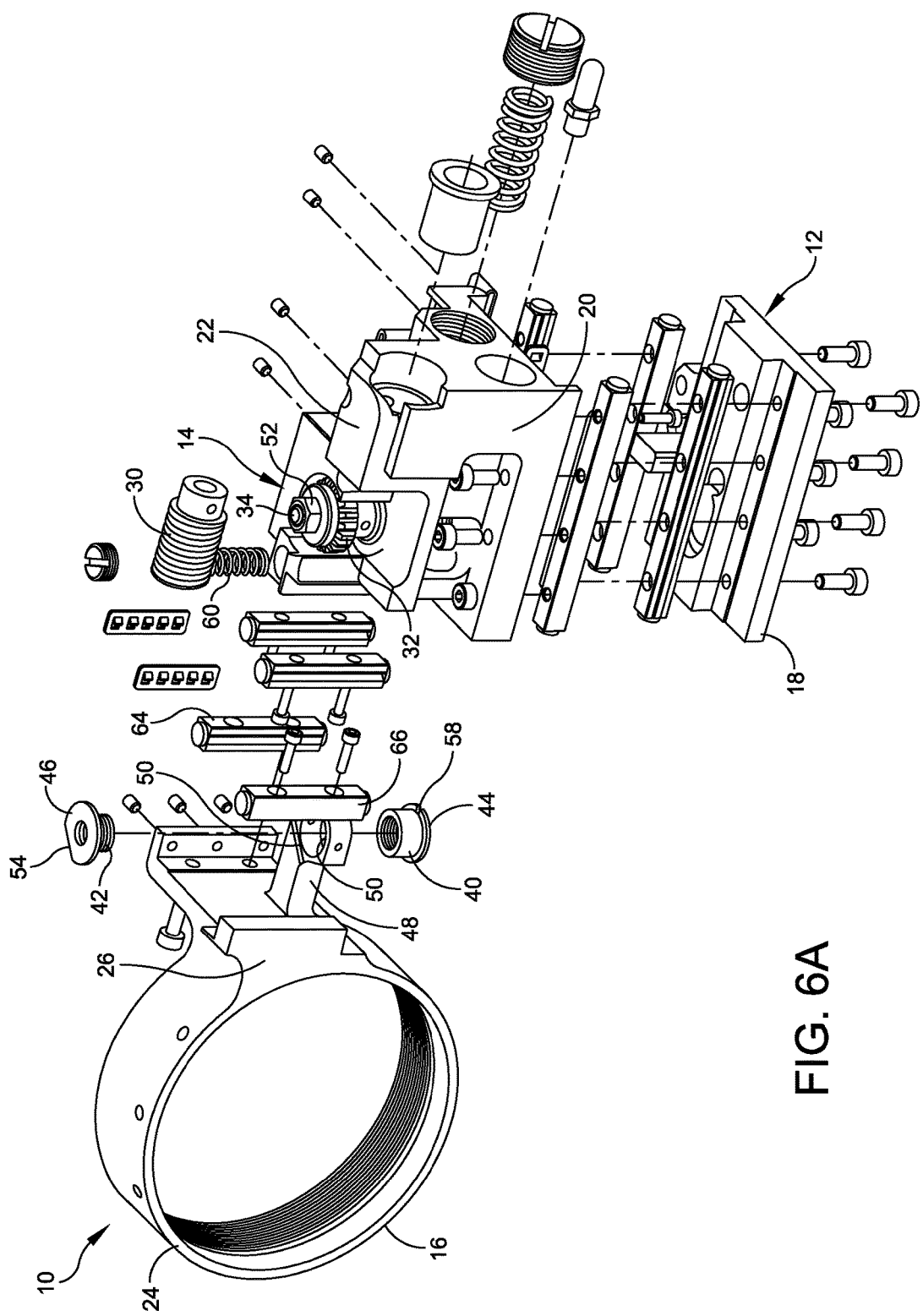
FIGS. 6A and 6B are exploded perspective views of the compensating drive nut assembly.
Figure 6B:
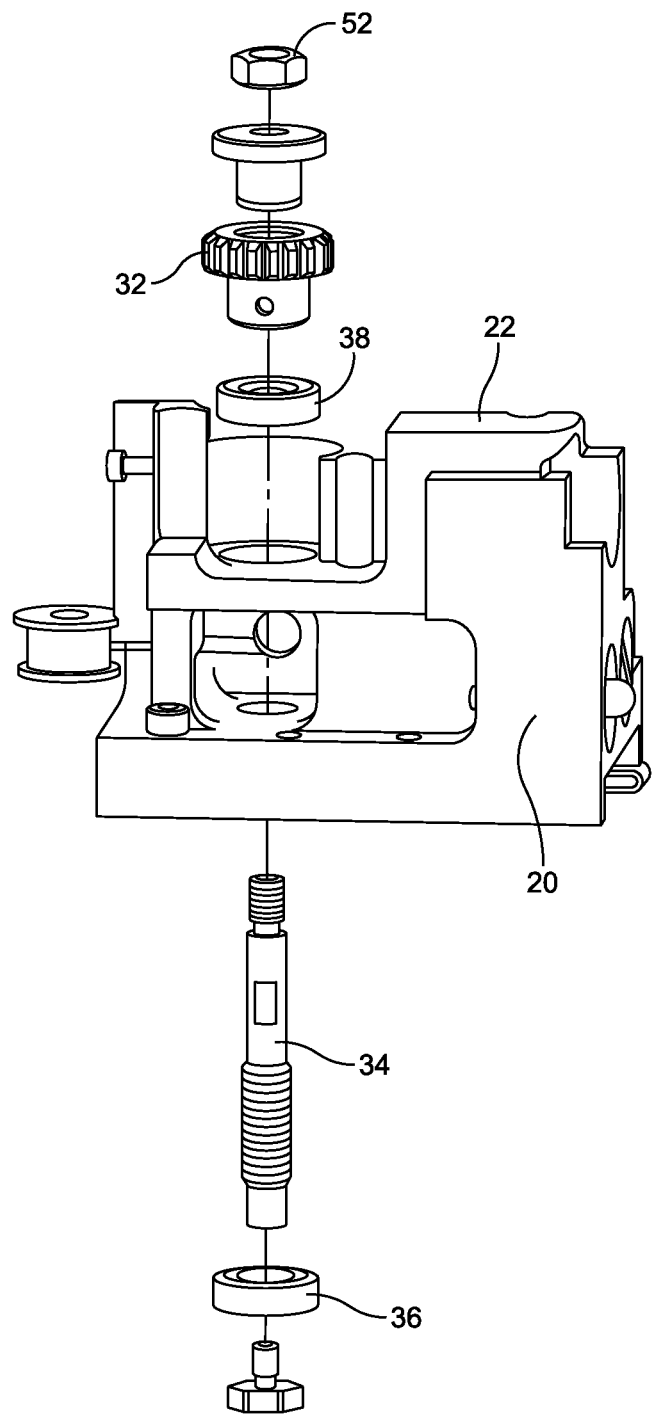

FIGS. 6A and 6B illustrate the components of the objective mount assembly 10 discussed above as well as other components of the objective mount assembly. As shown, the assembly 10 further includes threaded fasteners, springs, washers, bearings and other components to achieve a completed assembly. For example, a pair of cross roller guides 64, 66 is provided to secure the slide 22 to the support portion 26 of the objective mount 16.

As described herein, a method of assembling the drive assembly 14 of the objective mount assembly 10 includes locating the first bearing 36 on the lead screw 34 by sliding the first bearing on to the lead screw toward the head of the lead screw. The outer drive nut 40 and the inner drive nut 42 are assembled by threading the drive nuts together within the opening 50 of the extension member 48 of the objective mount 16. The outer and inner drive nuts 40, 42 when threaded together shut off with the end of the outer drive nut to stop against the head of the inner drive nut. The outer and inner drive nuts 40, 42 may be assembled using a thread locking adhesive or equivalent staking compound. It should be noted that other more permanent methods of nut assembly may be employed, including bonding, welding, soldering, brazing, riveting, etc., instead of threading. When assembled, the drive nut should move freely with respect to the mounting feature in the objective mount. The lead screw 34 is threaded through the inner drive nut 42 so that the first bearing 36 is seated within the cavity formed in the main body 20 of the housing assembly 12. The second bearing 38 is slid onto the lead screw 34, with the second bearing being located in the cavity of the slide 22. The worm gear 32 is slid onto the lead screw 34, preferably with gear teeth up. A flat on the lead screw is located next to a set screw in the worm gear, with the set screw being left lose. A gap setting tool is used to set a gap between a bottom of the outer drive nut 40 and a surface of a cut-out formed in the slide 22, with a preferable gap value of 3.9 mm. As shown in FIG. 1, a 3.9 mm blade or gage may be slid in between a bottom of the outer drive nut 40 and the cut-out in the slide 22 to set the objective mount 16 into a nominal center of a 7.8 mm travel range. The lead screw 34 is turned, with the second bearing being seated in its respective cavity and held in an installed position until the desired gap value is achieved. The retaining hex nut 52 is installed with washers onto the lead screw 34. The retaining hex nut 52 is tightened using a torque wrench to a torque of 1.25 inch-pounds (max.), and staked with a set screw or some other suitable fastener and then secured with a suitable adhesive. The set screw in the worm gear 32 is now tightened fully against a flat on the lead screw and held in place by adhesive applied to the threads. Once fully assembled, the objective mount assembly 10 is ready for use and operation.

A method of operating the objective mount assembly 10 includes driving the rotation of the drive shaft 28, thereby turning the worm 30 and the worm gear 32, which is secured to the lead screw 34. The lead screw 34 thus rotates to move the compensating drive nut assembly axially along a length of the lead screw. In one embodiment, the drive shaft 28 is rotated in a clockwise direction when viewed from the driven end, which in turn rotates the lead screw 34 in a counterclockwise direction, when viewed from the gear end or retaining hex nut end. Conversely, when rotating the drive shaft 34 in a counterclockwise direction when viewed from the driven end, the lead screw is rotated in a clockwise direction, when viewed from the gear end or retaining hex nut end. It should be noted that once assembled, the outer and inner drive nuts 40, 42 function as a single, solid part, which is moved upward or downward depending on the direction of rotation of the lead screw 34.

This invention solves the problem of binding in both manual and motorized mechanical lead screw drives. The potential for lead screw binding or increased drive torque requirements is reduced or eliminated entirely by a decoupling effect associated with the design of the present embodiment. Costly assembly alignment and higher manufacturing machining costs are avoided by eliminating tolerance stack-up at a drive nut assembly. Lead screw wear and particulate debris from wear is reduced by the better aligned drive and well aligned lead screw performs better at temperature where conditions resulting from alignment error can be amplified by thermal expansion.

Embodiments are not limited in their application to the details of construction and the arrangement of components set forth in the following description or illustrated in the drawings. For example, the objective mount may be configured to move any object, having any size and shape, in a desired direction. In addition, the size of the objective mount assembly may be determined based on the mass and size of the object to be moved. The configuration of the drive assembly of the objective mount assembly may be manipulated to achieve movement of the objective mount in a desired direction or a desired amount by changing the direction and size, lead and pitch of the threads of the worm drive, worm gear, and/or the outer and inner drive nuts. The compensating nut assembly may have additional features machined in or assembled on it to manage additional tasks in the design such as mounting a magnet or carrying a flag for a travel position switches or used to activate other electronics by similar means. In extreme high wear or high use environments, the nut assembly can be a replaceable item to reduce cost and down time. In assemblies where space and environment permit, the inner nut may be modified to provide lubrication to the drive screw either continuously as incorporated into a machine oiling system or periodical maintenance, such as the inclusion of a grease fitting. The design allows for costly materials or processes used to manage drive wear to be limited to the inner nut only, this reduces cost and opens design options. The compensating nut assembly is useful in drive development because different materials and thread pitches and leads can be easily introduced for evaluation without significantly impacting program cost or timing. The drive nut assembly is not limited by the guide mechanics or the drive mechanics.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. An objective mount assembly comprising:
a housing including a body;
a drive assembly supported by the body, the drive assembly including a drive shaft, a lead screw rotatably coupled to the drive shaft, and a compensating drive nut assembly having an inner nut component threadably coupled to the lead screw and an outer nut component threadably coupled to the inner nut component, the inner nut component having a threaded inner diameter, which interfaces with and matches a thread of a lead screw, the inner nut component further having a flange and the outer nut component having a flange, the objective mount being captured between the flanges of the inner and outer nut components; and
an objective mount coupled to the drive assembly.

2. The objective mount assembly of claim 1, wherein the inner nut component includes an anti-rotation feature that allows the assembled nut component to be axially compliant while preventing rotation.

3. The objective mount assembly of claim 2, wherein the anti-rotation feature is configured to lock the inner nut component and the outer nut component together when assembling the compensating drive nut assembly.

4. The objective mount assembly of claim 1, wherein the flange of the outer nut component includes a drive feature to facilitate locking the nut components together.

5. The objective mount assembly of claim 1, wherein a distance between the flanges of the inner and outer nut components is controlled during manufacture to produce a clearance fit on a mating part in the drive assembly.

6. The objective mount assembly of claim 1, wherein an external surface of the inner nut component is threaded to facilitate assembly with the outer nut component.

7. The objective mount assembly of claim 1, wherein the inner nut component and the outer nut component are secured to one another.

8. The objective mount assembly of claim 1, wherein the drive assembly further includes a worm secured to the drive shaft and a worm gear secured to the lead screw.

9. The objective mount assembly of claim 1, wherein the objective mount is configured to be secured to an object requiring movement.

10. A method of assembling a drive assembly of an objective mount assembly of the type including a housing and an objective mount, the method comprising:
locating a first bearing on a lead screw by sliding the bearing on to the lead screw toward a head of the lead screw;
assembling an outer drive nut component and an inner drive nut component by threading the drive nut components together on the slide with the objective mount being disposed between the outer and inner drive nut components, ensuring the drive nut components move freely with respect to one another;
threadably inserting the lead screw into the inner drive nut component;
locating a second bearing on the lead screw;
securing a worm gear onto the lead screw; and
setting a gap between a bottom of the outer drive nut component and a surface of a cut-out of in the slide.

11. The method of claim 10, wherein the gap is 3.9 mm.

12. The method of claim 10, further comprising installing a retaining hex nut onto the lead screw.

13. The method of claim 12, wherein the retaining hex nut is turned to a torque of 1.25 inch-pounds (max.), and staked with a set screw.

14. The method of claim 10, wherein the inner nut component and the outer nut component are secured to one another.

15. A method of operating an objective mount assembly of the type comprising a housing including a body, a drive assembly supported by the body, the drive assembly including a drive shaft, a lead screw rotatably coupled to the drive shaft, and a compensating drive nut assembly having an inner nut component threadably coupled to the lead screw and an outer nut component threadably coupled to the inner nut component, the inner nut component having a threaded inner diameter, which interfaces with and matches a thread of a lead screw, the inner nut component further having a flange and the outer nut component having a flange, the objective mount being captured between the flanges of the inner and outer nut components, and an objective mount coupled to the drive assembly, the method comprising:
driving the rotation of the drive shaft to drive the rotation of the lead screw to move the compensating drive nut assembly axially along a length of the lead screw thereby moving the objective mount with respect to the body.

16. The method of claim 15, wherein driving the rotation of the drive shaft includes turning a worm associated with the drive shaft, the worm being engaging a worm gear associated with the lead screw.

17. The method of claim 15, wherein the drive shaft is rotated in a clockwise direction when viewed from a driven end, which in turn rotates the lead screw in a counterclockwise direction to move the drive nuts downwardly to lower the objective mount.

18. The method of claim 17, wherein the drive shaft is rotated in a counterclockwise direction when viewed from the driven end, which in turn rotates the lead screw in a clockwise direction to move the drive nuts upwardly to raise the slide and the objective mount.

* * * * *

UNITED STATES PATENT AND TRADEMARK OFFICE
CERTIFICATE OF CORRECTION

PATENT NO. : 10,012,296 B2
APPLICATION NO. : 14/442553
DATED : July 3, 2018
INVENTOR(S) : John Maxwell Connolly It is certified that error appears in the above-identified patent and that said Letters Patent is hereby corrected as shown below:

On the Title Page

<u>Item (57), in the Abstract should read</u>:
An objective mount assembly includes a housing having a body and a drive assembly supported by the body. The drive assembly includes a drive shaft, a lead screw rotatably coupled to the drive shaft, and a compensating drive nut assembly. The compensating drive nut assembly has an inner nut component threadably coupled to the lead screw and an outer nut component threadably coupled to the inner nut component. The objective mount assembly further includes an objective mount coupled to the drive assembly. Other aspects of the assembly are further disclosed.

Signed and Sealed this
Twenty-fifth Day of September, 2018

Andrei Iancu
*Director of the United States Patent and Trademark Office*